US012615265B2

(12) United States Patent　　　　　(10) Patent No.:　US 12,615,265 B2

McGary　　　　　　　　　　　　　　　(45) Date of Patent:　Apr. 28, 2026

(54) SYSTEM AND METHOD FOR PROVIDING SECURED CAN COMMUNICATIONS

(71) Applicant: TOYOTA JIDOSHA KABUSHIKI KAISHA, Toyota (JP)

(72) Inventor: Caleb McGary, Tokyo (JP)

(73) Assignee: TOYOTA JIDOSHA KABUSHIKI KAISHA, Toyota (JP)

( * ) Notice:　Subject to any disclaimer, the term of this patent is extended or adjusted under 35 U.S.C. 154(b) by 29 days.

(21) Appl. No.: 18/613,700

(22) Filed: Mar. 22, 2024

(65) Prior Publication Data

US 2025/0300993 A1　　Sep. 25, 2025

(51) Int. Cl.
*H04L 9/40*　　　　　(2022.01)
*H04L 12/40*　　　　(2006.01)
(52) U.S. Cl.
CPC ............ *H04L 63/123* (2013.01); *H04L 12/40* (2013.01); *H04L 63/0838* (2013.01); *H04L 2012/40215* (2013.01)
(58) Field of Classification Search
CPC ... H04L 63/123; H04L 12/40; H04L 63/0838; H04L 2012/40215
See application file for complete search history.

(56) References Cited

U.S. PATENT DOCUMENTS

| | | | | |
|---|---|---|---|---|
| 2011/0238989 A1* | 9/2011 | Machani | ............... | H04L 9/3242 |
| | | | | 713/168 |
| 2015/0324789 A1* | 11/2015 | Dvorak | ................. | H04L 9/3297 |
| | | | | 705/67 |
| 2016/0140545 A1* | 5/2016 | Flurscheim | ........... | H04L 9/3234 |
| | | | | 705/76 |
| 2017/0235956 A1* | 8/2017 | Maletsky | ................ | H04L 63/20 |
| | | | | 726/1 |
| 2017/0279795 A1* | 9/2017 | Redberg | .............. | H04L 63/0861 |
| 2019/0132731 A1* | 5/2019 | Covain | ............. | H04W 12/0431 |
| 2019/0238555 A1* | 8/2019 | Buffard | ............... | H04L 63/0823 |
| 2020/0044842 A1* | 2/2020 | Usui | ..................... | H04L 9/0822 |
| 2021/0167953 A1* | 6/2021 | Islam | ................... | H04L 9/3242 |
| 2021/0344672 A1* | 11/2021 | Drechsler | ............ | G06Q 20/401 |
| 2022/0046114 A1* | 2/2022 | Entelis | ................... | H04L 69/04 |

(Continued)

FOREIGN PATENT DOCUMENTS

| | | |
|---|---|---|
| JP | 2014531855 A | 11/2014 |
| JP | 2023509539 A | 3/2023 |
| WO | 2013049689 A1 | 4/2013 |

*Primary Examiner* — Khalid M Almaghayreh
(74) *Attorney, Agent, or Firm* — Sughrue Mion, PLLC

(57)　　　　　　　ABSTRACT

Example embodiments of the present disclosure provide secured controller area network (CAN) communications among vehicle components. According to embodiments, a method for providing may include: generating, by at least one processing unit of a sender, a one-time passcode (OTP); obtaining, by the at least one processing unit of the sender, a master key pre-provisioned to the sender and the receiver; deriving, by the at least one processing unit of the sender, a shared key based on the OTP and the master key; generating, by the at least one processing unit of the sender, a message authentication code (MAC) based on the derived shared key; appending, by the at least one processing unit of the sender, the MAC to a message; and transmitting, by the at least one processing unit of the sender, the appended message to a receiver via a CAN bus.

20 Claims, 5 Drawing Sheets

(56)　　　　　　References Cited

U.S. PATENT DOCUMENTS

| | | | |
|---|---|---|---|
| 2022/0094540 A1* | 3/2022 | Kurachi | H04L 9/14 |
| 2022/0353056 A1 | 11/2022 | Wang | |
| 2023/0020656 A1* | 1/2023 | Momchilov | H04L 63/0807 |
| 2024/0235841 A1* | 7/2024 | Osborn | H04L 9/3234 |
| 2024/0388427 A1* | 11/2024 | Pettit | H04L 9/0861 |

* cited by examiner

Start

Receive appended message
S610

Generate OTP
S620

Obtain master key
S630

Derive shared key
S640

Generate MAC
S650

Verify appended message
S660

Perform operation to manage the appended message
S670

End

600

Start

Generate OTP
S510

Obtain master key
S520

Derive shared key
S530

Generate MAC
S540

Append MAC to message
S550

Transmit appended message
S560

End

500

SYSTEM AND METHOD FOR PROVIDING SECURED CAN COMMUNICATIONS

TECHNICAL FIELD

Example embodiments of the present disclosure relate to vehicle systems, and more particularly, to the provisioning of secured controller area network (CAN) communications among the components of one or more vehicle systems.

BACKGROUND

In the automotive field, electronic control units (ECUs) are widely used as the embedded systems to control various functions within vehicles and the systems associated therewith. These functions may include, for example, engine management, transmission control, stability control, powertrain control, airbag control, and the like. Generally, the operations of the ECUs involve data exchanges and communications among an ECU and other vehicle components (e.g., other ECUs, sensors, actuators, etc.). These data exchanges and communications are performed via one or more buses, such as a CAN bus, an Ethernet bus, and the like. In particular, the CAN bus is widely adopted, since it provides a high level of reliability for multiple ECUs and devices to communicate with each other in real-time.

Ensuring the security of communications and data exchanges between an ECU and other vehicle components is crucial in order to provide correct, safe, and reliable vehicle functionalities. The CAN bus, although can provide simple yet efficient communications among an ECU and vehicle components, is not secured by design since authentication, confidentiality, and integrity are not considered in the design and implementation of the associated protocols. In the related art, several safety mechanisms have been introduced for authentication and integrity protection to enhance the security of CAN bus communications. For instance, AUTomotive Open System Architecture (AUTOSAR) has provided a secure onboard communication (SecOC) module for securing communications among ECUs over the CAN bus network, thereby ensuring that the data received by an ECU comes from the correct ECU and has the correct value.

Referring to FIG. 1, which illustrates a diagram of an example implementation of a SecOC module in the related art. In the example of FIG. 1, a sender 110 is configured to communicate with a receiver 120 via sending a protocol data unit (PDU) thereto. The sender 110 and receiver 120 may each be an ECU and may each be pre-provisioned a static, shared secret key.

Before sending the PDU to the receiver 120, the sender 110 computes a message authentication code (MAC) using the shared secret key, and then adds or appends the information of the MAC to the PDU to create a secured PDU. Accordingly, the secured PDU is transmitted to the receiver 120 via, for example, a CAN bus. The receiver 120 receives the secured PDU and computes another MAC using the same shared secret key. Accordingly, the receiver 120 may utilize said another MAC to verify the secured PDU. For instance, if the MAC computed by the receiver 120 matches the MAC that was included or appended to the secured PDU, the receiver 120 can thereby determine that the secured PDU was sent by a trusted sender and has not been tampered with, and the PDU can be further utilized thereafter. Otherwise, the receiver 120 may determine that the MAC verification is failed, and may then reject or discard the received PDU.

The implementations of the SecOC module, as described above, required the pre-provisioning and sharing of a static secret key across the ECUs. Even though the utilization of a hardware security module (HSM) has been introduced in the related art to secure the static shared secret key, there is still a risk that the key can be easily compromised since the key has still to be pre-provisioned to ECUs that do not have any HSM under certain situations.

In this regard, since the shared secret key is static across the ECUs, compromising the shared secret key even once could enable an attacker to attack all associated ECUs. For example, based on a compromised secret key, the attacker can perform CAN injection attacks to inject or send spoofed/fake signals to manipulate the information processed by the target ECUs. This enables the attacker to control the critical safety functionalities of a target vehicle, such as turning off the brakes of the vehicle, triggering an airbag deployment, making vehicle components to give false readings, and the like.

In view of at least the above reasons, there is a need to provide enhanced and secured CAN communications among the vehicle components, particularly among an ECU and other vehicle components.

SUMMARY

Example embodiments consistent with the present disclosure provide methods, systems, and apparatuses for dynamically deriving a shared secret key that does not exist when the vehicle is in an ignition-off (IG-OFF) state and changes every time the vehicle enters into an ignition-on (IG-O) state, thereby providing enhanced CAN communications among the vehicle components.

According to embodiments, a method for providing secured CAN communications among a sender and a receiver is provided. The method may include: generating, by at least one processing unit of the sender, a one-time passcode (OTP); obtaining, by the at least one processing unit of the sender, a master key pre-provisioned to the sender and the receiver; deriving, by the at least one processing unit of the sender, a shared key based on the OTP and the master key; generating, by the at least one processing unit of the sender, a message authentication code (MAC) based on the derived shared key; appending, by the at least one processing unit of the sender, the MAC to a message; and transmitting, by the at least one processing unit of the sender, the appended message to the receiver via a CAN bus.

According to embodiments, a system for providing secured CAN communications among the sender and the receiver is provided. The system may include a memory storage configured to store computer-executable instructions and at least one processing unit communicatively coupled to the memory storage. The at least one processing unit may be configured to: generate a one-time passcode (OTP); obtain a master key pre-provisioned to the sender and the receiver; derive a shared key based on the OTP and the master key; generate a message authentication code (MAC) based on the derived shared key; append the MAC to a message; and transmit the appended message to the receiver via a CAN bus.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like reference numerals denote like elements, and wherein.

DETAILED DESCRIPTION

Figure 1:
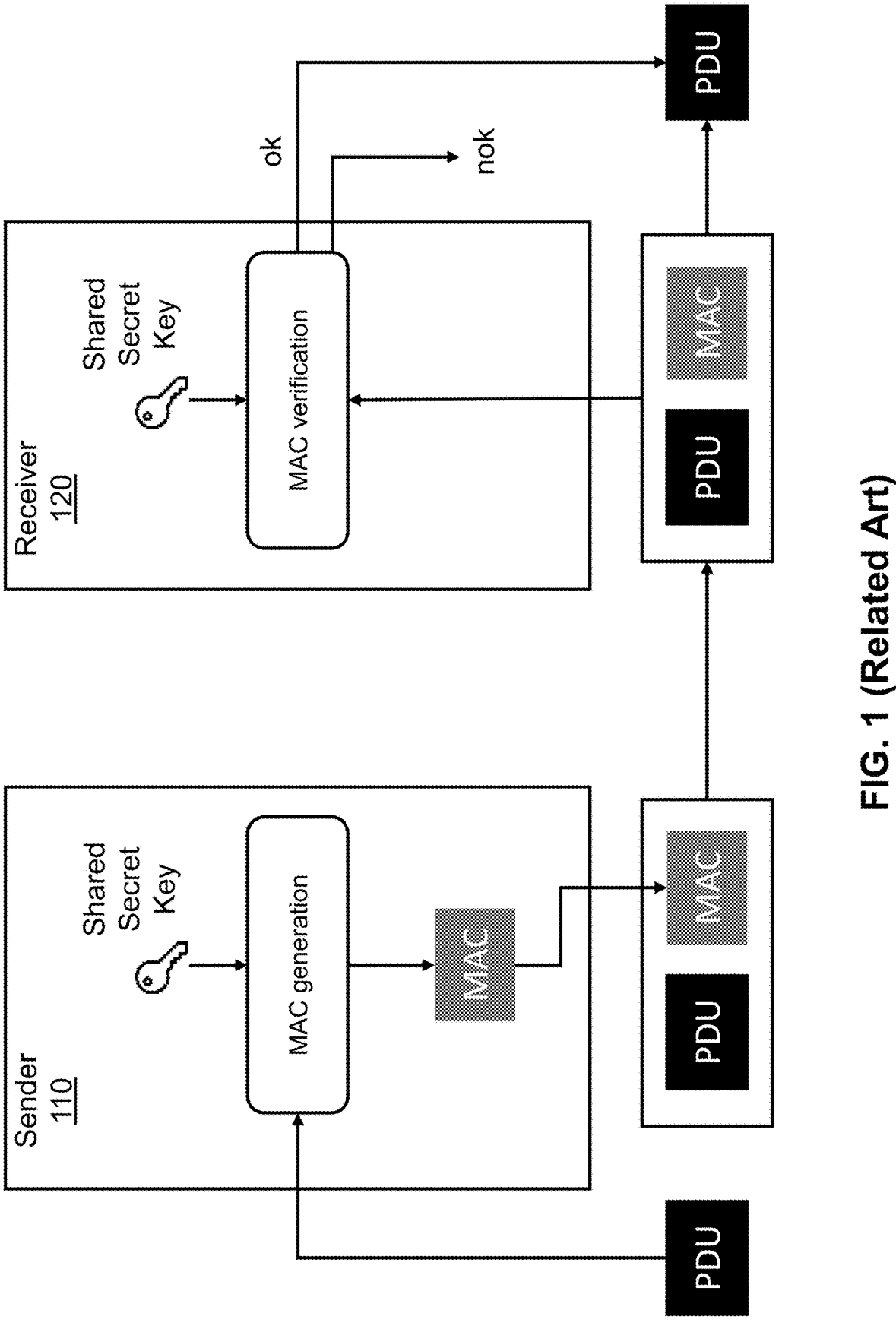
FIG. 1 illustrates a diagram of an example implementation of a SecOC module in the related art.

The following detailed description of exemplary embodiments refers to the accompanying drawings. The foregoing disclosure provides illustration and description but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "[A] and/or [B]", "at least one of [A] and [B]" or "at least one of [A] or [B]" are to be understood as including only A, only B, or both A and B.

Reference throughout this specification to "one embodiment," "an embodiment," "non-limiting exemplary embodiment," or similar language means that a particular feature, structure, or characteristic described in connection with the indicated embodiment is included in at least one embodiment of the present solution. Thus, the phrases "in one embodiment", "in an embodiment," "in one non-limiting exemplary embodiment," and similar language throughout this specification may, but do not necessarily, all refer to the same embodiment.

Furthermore, the described features, advantages, and characteristics of the present disclosure may be combined in any suitable manner in one or more example embodiments. One skilled in the relevant art will recognize, in light of the description herein, that the present disclosure can be practiced without one or more of the specific features or advantages of a particular embodiment. In other instances, additional features and advantages may be recognized in certain embodiments that may not be present in all embodiments of the present disclosure.

Furthermore, the term "vehicle" described herein refers to any suitable type of vehicle in which example embodiments of the present disclosure can be implemented. For instance, the "vehicle" may refer to a motorized vehicle such as a car, a truck, a bus, a motorcycle, or any other suitable type of automobile powered by an engine, motor, or other mechanical means. Alternatively or additionally, the "vehicle" described herein may refer to a bicycle, a skateboard, and any other suitable types of non-motorized vehicle, without departing from the scope of the present disclosure.

In addition, although example embodiments of the present disclosure are described herein with reference to the communications among ECUs, it is contemplated that the example embodiments may also be applicable to provide secured communications among other vehicle components, such as among an ECU and an on-board sensor, among the ECU and an actuator, among the on-board sensor and the actuator, and the like, without departing from the scope of the present disclosure.

Related art systems and methods, as described above, require the pre-provisioning of a static shared key on the ECUs such that the ECUs may utilize the static shared key to generate the MAC and then verify, based on the MAC, the communication messages in terms of authenticity and integrity. Example embodiments of the present disclosure, on the other hand, do not require a static shared key to be pre-provisioned on the ECUs. Rather, example embodiments of the present disclosure utilize variable parameters to derive a symmetric key according to, for example, the vehicle state. For instance, each of the ECUs that communicate with other vehicle components (e.g., other ECUs, sensors, actuators, etc.) via the CAN bus may derive the same key when the vehicle changes from an ignition-OFF (IG-OFF) state to an ignition-ON (IG-ON) state (e.g., when the vehicle is first started up), and the derived shared key can then be utilized to secure the communications among the ECUs. This shared key does not exist when the vehicle is in the IG-OFF state, and the shared key is derived dynamically when the vehicle is started up and is different each time the vehicle enters the IG-ON state. Example operations associated with the derivation of the key, according to one or more example embodiments, are described in the following with reference to FIG. 2.

Figure 2:
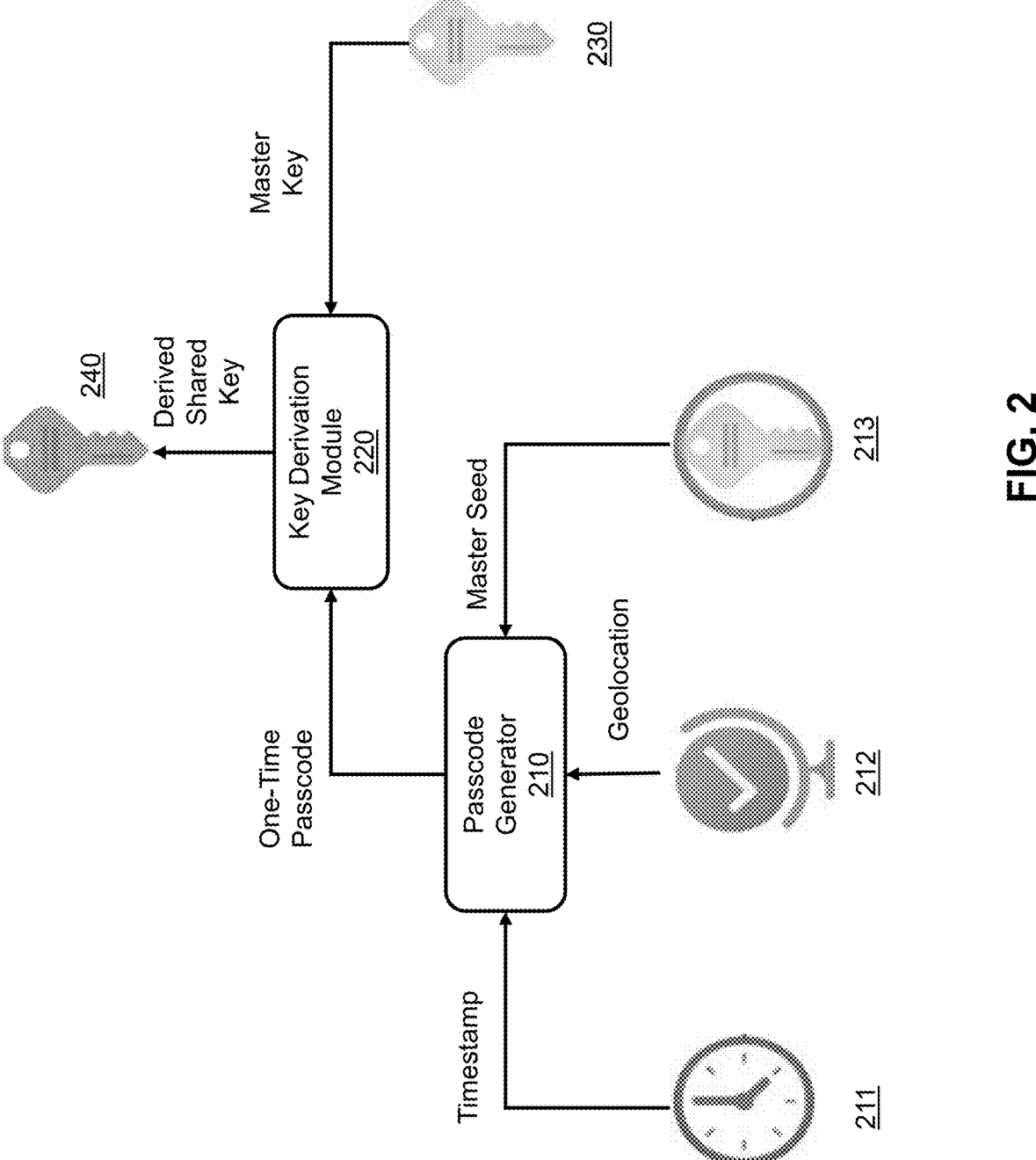
FIG. 2 illustrates a diagram of example operations for dynamically deriving a shared key, according to one or more example embodiments.

FIG. 2 illustrates a diagram of example operations for dynamically deriving a shared key, according to one or more example embodiments. The passcode generator 210 and key derivation module 220 in FIG. 2 may be implemented as functional modules of an ECU and may be implemented in different forms of hardware, firmware, or a combination of hardware and software. In this regard, it is contemplated that one or more operations described herein with reference the passcode generator 210 and the key derivation module 220 may be performed by a hardware (e.g., a processing unit, etc.) upon executing a software or computer-executable instructions for implementing the passcode generator 210 and the key derivation module 220.

The passcode generator 210 may be configured to generate one or more one-time passcodes (OTPs) and then provide the generated one or more OTPs to the key derivation module 220 for further processing. The generation of the OTP(s) may be initiated or triggered according to the state of the vehicle. For instance, whenever the vehicle changes from an IG-OFF state to an IG-ON state, the ECUs may be powered on and the generation of the OTP(s) may be automatically initiated in each of the ECUs of which the communications with other vehicle components is required to be verified by the message authentication code (MAC).

According to example embodiments, the passcode generator 210 may be configured to obtain information of a timestamp 211, information of a geographical location 212, and information of a master seed 213, and then generate the one or more OTPs based on the timestamp, geographical location, and the master seed.

The timestamp 211 may be associated with the timing at which the vehicle changes from the IG-OFF state to the IG-ON state (e.g., when the vehicle is first started up). The passcode generator 210 may obtain the information of the timestamp from an internal clock of the ECU, wherein the internal clock may be configured to record and provide the timestamp information associated with the vehicle state (e.g., when the vehicle first enters the IG-ON state, when the vehicle is in parking state, etc.)

According to example embodiments, upon receiving the timestamp, the passcode generator 210 may truncate the timestamp according to a tolerance level. For instance, based on a predefined tolerance level, the passcode generator 210 may discard the milliseconds component of the timestamp to achieve a tolerance level of seconds, may round the timestamp to the nearest whole second, and the like. In this way, each ECU can generate the same OTP(s) (and thereby derive the same key) as long as the timestamp is within the tolerance level.

The geographical location 212 may be associated with a location of the vehicle (in which the ECUs are deployed), such as the latitude and longitude coordinates (or other locational and/or positional data) of the vehicle when the vehicle enters the IG-ON state. The passcode generator 210 may obtain the information of the geographical location through various means, such as a global positioning system (GPS) coordination, an inertial navigation system (INS) measurement, a cellular or wireless network triangulation, and the like.

The master seed 213 may include a set of values stored securely within the ECU's memory or firmware. The master seed may be pre-provisioned to the ECUs by the vehicle manufacturer or system administrator, during the manufacturing or initialization process of the ECUs. The access to and utilization of the master seed is restricted only to the passcode generator 210.

Upon obtaining the timestamp 211, the geographical location 212, and the master seed 213, the passcode generator 210 may combine these information or data to generate the one or more OTPs. For instance, the passcode generator 210 may perform one or more operations, such as concatenation, cryptographic hashing, cryptographic signing, and the like, to generate the one or more OTPs based on the timestamp, the geographical location, and the master seed. Accordingly, since the timestamp and/or geographical location of the vehicle varies whenever the vehicle changes from the IG-OFF state to the IG-ON state, the passcode generator 210 can generate and provide unique and dynamic OTP(s) to the key derivation module 220 for the derivation of one or more unique and dynamic shared keys.

The key derivation module 220 may be configured to obtain the one or more OTPs (from the passcode generator 210) and a master key 230, and then derive a shared key 240 based thereon. The master key 230 may include a secret cryptographic key used as a basis for deriving the shared key 240 and may be pre-provisioned to each of the ECUs during manufacturing or initialization processes.

The key derivation module 220 may combine the unique OTP(s) (provided by the passcode generator 210) with the master key 230, thereby deriving a unique shared key 240. The key derivation module 220 may perform one or more cryptographic algorithms, such as key derivation function (KDF), hash-based function (e.g., SHA-256, SHA-512, etc.), and the like, to derive the shared key 240 based on the OTP(s) and the master key 230. Similar to the generation of OTP(s), the derivation of the shared key may also be initiated or triggered according to the states of the vehicle. For instance, whenever the vehicle changes from the IG-OFF state to the IG-ON state, the ECUs may be powered-on and the derivation of the shared key may be automatically initiated in each of the ECUs, after the generation of the OTP(s).

It is contemplated that the configuration illustrated in FIG. 2 is only one of the possible configurations, and the actual implementation of the example embodiments is not limited thereto. Specifically, in some implementations, multiple master seeds 213 and/or multiple master keys 230 may be involved in the processes of deriving the shared key 240, the timestamp 211 may be obtained from a component external to the ECU, and the like, without departing from the disclosure of the present disclosure.

In view of the above, example embodiments of the present disclosure may provide a unique and dynamic shared key every time the vehicle changes, for example, from the IG-OFF state to the IG-ON state. The shared key does not exist when the vehicle is in the IG-OFF state, and changes every time the vehicle enters the IG-ON state. Accordingly, the risk of the shared key being compromised can be significantly reduced as compared to the utilization of pre-provisioned static shared key in the related art.

Next, example operations in which the derived shared key is implemented, according to one or more example embodiments, are described in the following with reference to FIG. 3. Specifically, FIG. 3 illustrates a diagram of an example implementation of the SecOC module, according to one or more example embodiments.

Figure 3:
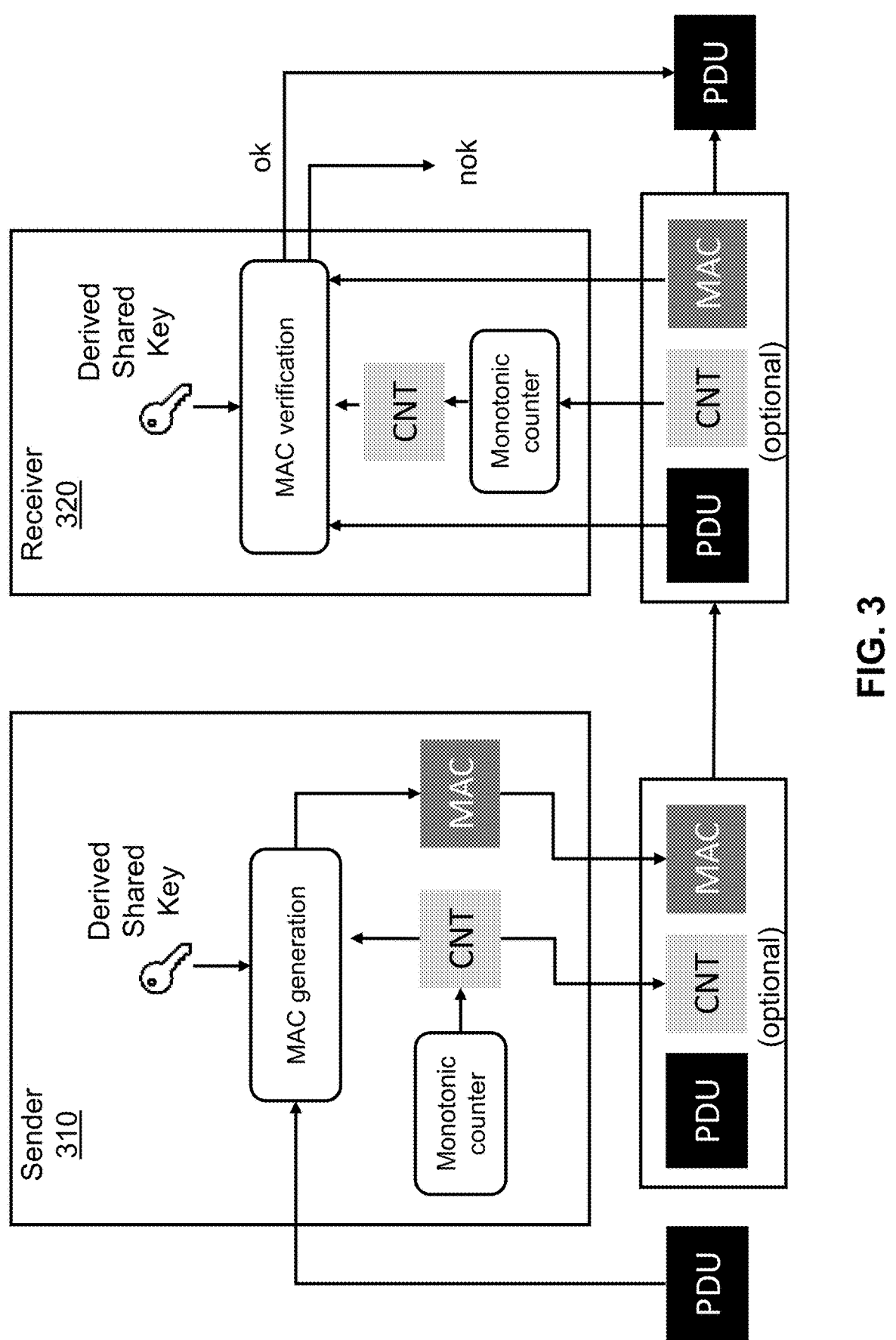
FIG. 3 illustrates a diagram of an example implementation of the SecOC module, according to one or more example embodiments.

In the example of FIG. 3, the sender 310 is configured to communicate with the receiver 320 via sending a protocol data unit (PDU). The sender 310 and receiver 320 may each be an ECU and may each include a passcode generator and a key derivation module (described above with reference to FIG. 2). By leveraging the passcode generator and key derivation module, the sender 310 and the receiver 320 may each generate the unique shared key when they are first powered-on (when the vehicle first entered into the IG-ON state). Detailed descriptions associated with the deviation of the shared key have been described above with reference to FIG. 2, thus redundant descriptions associated therewith may be omitted for conciseness.

The general operations in FIG. 3 for securing the PDU via MAC generation and MAC verification may be similar to those described in FIG. 1. The differences between the implementations of FIG. 3 and FIG. 1 are that, the shared key in FIG. 1 is static and pre-provisioned to the sender and the receiver, while the shared key in FIG. 3 is dynamically generated by the sender and the receiver when they are first powered on. Further, FIG. 3 utilizes an optional monotonic counter to provide one or more counter values, such that the sender 310 and the receiver 320 may utilize the one or more counter values for securing the PDU in addition to the derived shared key.

Before sending the PDU to the receiver 320, the sender 310 computes a message authentication code (MAC) using the derived shared key (that is derived by the sender 310 when it is first powered on), and then adds information of the MAC to the PDU to create a secured PDU.

Optionally, the computing of the MAC and the creation of the secured PDU may further involve a counter value, in addition to the derived shared key. In the example of FIG. 3, the sender 310 includes a monotonic counter that increases over time and provides a counter value associated with the current monotonic counter whenever the sender 310 sends a message over the network. In this regard, the monotonic counters in sender 310 and receiver 320 may be synchronized during startup or communication initialization, so as to ensure that both the sender 310 and the receiver 320 have a consistent starting point for their monotonic counters, preventing issues such as message rejection due to a large initial counter difference and the like. Since the utilization of counter value may provide freshness to the message, the counter value may also be referred to as a "freshness value" in some implementations.

In the case where the counter value is involved, the sender 310 may obtain the counter value from the monotonic counter, and then generate the MAC based on both the counter value and the derived shared key. Further, the sender 310 may also append the information of both the counter value and the generated MAC into the message (e.g., PDU), thereby creating an appended message (e.g., secured PDU).

According to example embodiments, the sender 310 may truncate the MAC and the counter value, and then append the truncated MAC and the truncated counter value to the PDU to create the secured PDU. For instance, the MAC and the counter value may be truncated according to one or more tolerance levels. Alternatively or additionally, the MAC and the counter value may be truncated down to the most significant bits. The truncation of the MAC and the counter value may be desired when the message payload is limited in length and/or does not have sufficient space to include the full MAC and/or the full counter value.

Upon generating the appended message (e.g., secured PDU), the sender 310 may transmit the appended message to the receiver 320 via, for example, a CAN bus. The receiver 320 receives the appended message and verifies the appended message before further utilizing the appended message. Specifically, the receiver 320 may compute another MAC using the derived shared key (that is derived by the receiver 320 when it is first powered on) and then utilize said another MAC to verify the appended message. For instance, if the MAC computed by the receiver 320 matches the MAC that was included or appended to the message, the receiver 320 can thereby determine that the appended message is verified and was sent by a trusted sender/has not been tampered with, and may then extract the message from the appended message for further utilization. Otherwise, the receiver 320 may determine that the MAC verification has failed and the appended message is not verified, and may then reject or discard the received message.

According to example embodiments in which the appended message includes the counter value, the receiver 320 may also check the counter value included in the appended message upon receiving the appended message. For instance, the receiver 320 may obtain information of the previously received counter value, and then compare the last received counter value with the counter value included in the appended message. If the counter value in the appended message is greater than the previously received counter value, the newly received appended message is considered fresh and valid, and the receiver 320 may update the previously stored counter value to the newly received counter value that is included in the appended message. Accordingly, the receiver 320 may utilize the latest counter value (stored within a memory of the receiver 320 or provided by the monotonic counter of the receiver 320), in addition to the derived shared key, to compute the MAC for verifying the appended message. On the other hand, if the counter value in the appended message is less than or equal to the previously received counter value, the newly received appended message may be considered stale or a potential replay attack, and the receiver 320 may reject or discard the newly received appended message.

Figure 4:
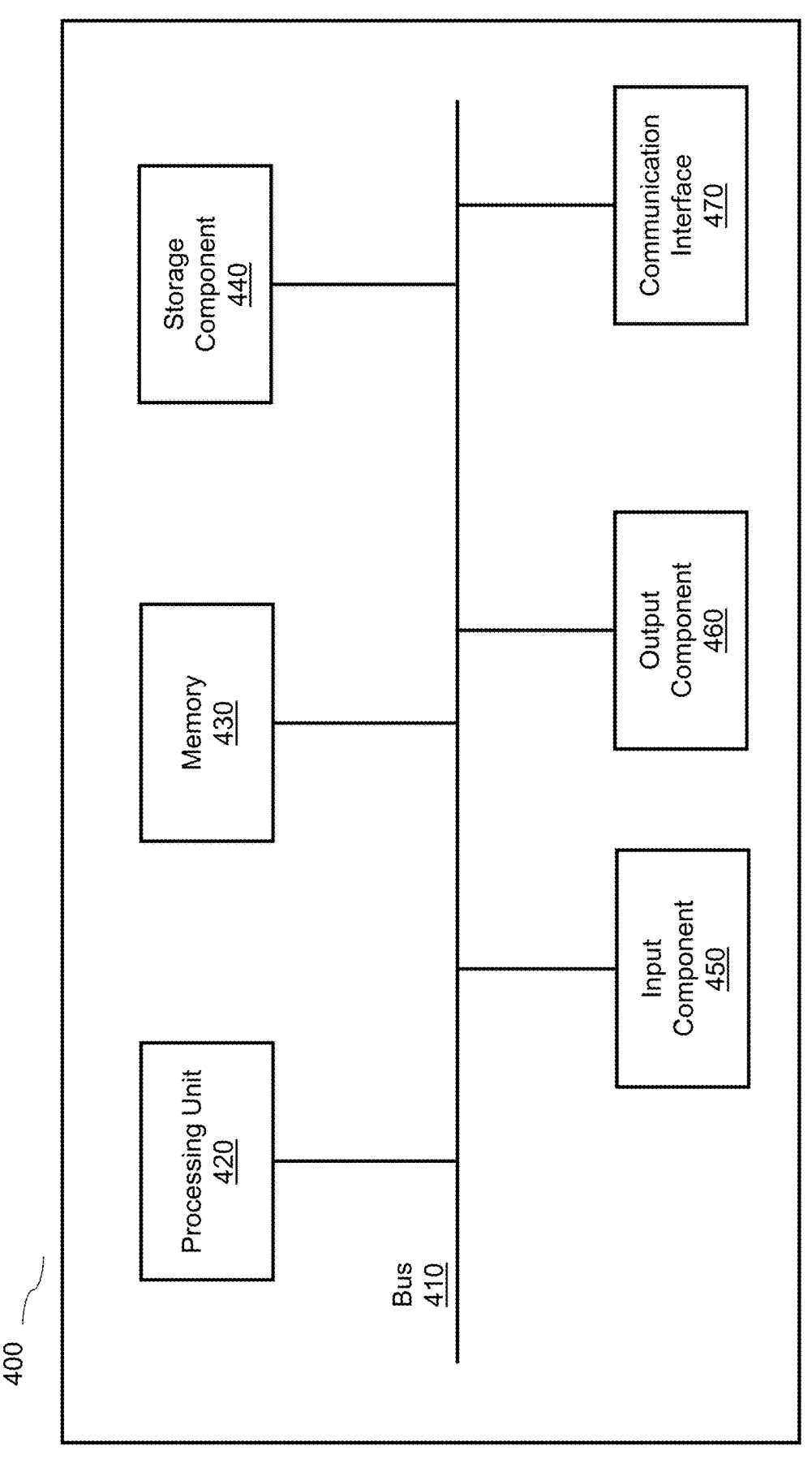
FIG. 4 illustrates a block diagram of example components of an ECU, according to one or more example embodiments.

Referring next to FIG. 4, which illustrates a block diagram of example components of an ECU 400, according to one or more example embodiments. The ECU 400 may include one or more ECUs responsible for controlling various vehicle functions, such as ECUs responsible for engine management, transmission control, braking systems, and the like. In this regard, it is contemplated that each of the sender 310 and the receiver 320 (and the functional modules such as the passcode generator and key deviation module) described hereinabove, as well as the operations associated therewith, may be implemented by the ECU 400.

As illustrated in FIG. 4, the ECU 400 may include at least one bus 410, at least one processing unit 420, at least one memory 430, at least one storage component 440, at least one input component 450, at least one output component 460, and at least one communication interface 470. It is contemplated that the ECU 400 may include more or less components than illustrated in FIG. 4, without departing from the scope of the present disclosure. For instance, in some embodiments, the ECU 400 may include a plurality of storage components 440, the input component 450 and the output component 460 may be implemented as a transceiver component, the memory 430 and storage component 440 may be implemented as a memory storage, and the like.

The bus 410 may be configured to facilitate or enable communications among the components of the ECU 400. Specifically, the bus 410 may communicatively couple the components to each other and provide a means for data transfer and flow of control signals between the components. The bus 410 may include one or more of: an internal bus, an address bus, a data bus, a control bus, and any other suitable type of bus that can be implemented in the ECU 400 to enable communication and coordination between the components within the ECU 400.

The processing unit 420 may be implemented in hardware, firmware, or a combination of hardware and software, and may be configured to handle real-time (or near real-time) data processing and control of the ECU 400. The processing unit 420 may include one or more of: a microcontroller unit (MCU), a microprocessor, a digital signal processor (DSP), a field-programmable gate array (FPGA), an application-specific integrated circuit (ASIC), a system-on-chip (SoC), a central processing unit (CPU), a graphics processing unit (GPU), and any other suitable type of processing unit that can be implemented in the ECU 400. In some implementations, the processing unit 420 may be capable of being programmed to perform one or more operations described herein. Further, the processing unit 420 may include a plurality of processing units, each of which is dedicated to performing a specific operation (e.g., one processing unit may be assigned to perform operations of the passcode generator, one processing unit may be assigned to perform operations of the key derivation module, etc.)

The memory 430 may include one or more mediums for storing temporary data, runtime variables, program instructions, and buffers required for the ECU's operation. The memory 430 may include one or more of: a flash memory, a read-only memory (ROM), a random-access memory (RAM), a dynamic or static storage device, and any other suitable type of memory that can be implemented in the ECU 400.

The storage component 440 may be configured to store non-volatile data, such as firmware, configuration settings, calibration data, and other persistent information required for the ECU's operations. For instance, the storage component 440 may store one or more counter values, one or more pre-provisioned master seeds, one or more pre-provisioned master keys, one or more predefined tolerance levels, and the like. Further, the storage component 440 may also store computer-readable or computer-executable instructions for implementing one or more operations described herein. The storage component 440 may provide the stored information to the memory 430 for the execution of the processor 420. The storage component 440 may include one or more of: a flash memory, a read-only memory (ROM), a solid-state storage medium, and any other suitable type of storage component that can be implemented in the ECU 400.

The input component 450 may include one or more input components that enable the ECU 400 to receive information from one or more external vehicle components, such as one or more sensors (e.g., an engine sensor that provides signals regarding the IG-OFF state and IG-ON state, etc.), one or more positioning systems (e.g., Global Positioning System (GPS), Inertial Navigation System (INS), etc.) that provide geographical location information of a vehicle in which the ECU 400 is deployed, a timing device (e.g., an internal clock, a real-time clock (RTC), etc.) that provides a timestamp information, a counter (e.g., a monotonic counter, etc.) that provides a counter value, and the like. Further, the input component 450 may also include components that enable the ECU 400 to receive one or more user inputs (e.g., user input to provide updates on the master seed and master key, etc.). According to example embodiments, the input component 450 may include a local interconnect network (LIN) receiver, a CAN bus receiver, a CAN transceiver, a FlexRay transceiver, a wireless transceiver, and the like, which enables the ECU 400 to receive messages or data from another vehicle component (e.g., another ECU, etc.).

The output component 460 may include one or more output components that enable the ECU 400 to provide information to one or more external vehicle components, such as one or more sensors, and the like. Further, the output component 460 may also include components that enable the ECU 400 to output information to one or more users (e.g., determination of non-verified message, etc.). According to example embodiments, the output component 460 may include a LIN transmitter, a CAN bus transmitter, a CAN transceiver, a FlexRay transceiver, a wireless transceiver, and the like, which enables the ECU 400 to transmit messages or data to another vehicle component (e.g., another ECU, etc.).

The communication interface 470 may include one or more interfaces that facilitate the communications of the components of the ECU 400 with one or more external vehicle components. For instance, the communication interface 470 may facilitate the exchange of messages or data between ECU 400 and another ECU, between ECU 400 and sensors/actuators, and the like. According to example embodiments, the communication interface 470 may include a CAN controller interface that manages the transmission and reception of messages of the ECU 400 via the CAN bus. Further, the communication interface 470 may include one or more application programming interfaces (APIs) that allow the ECU 400 (or one or more components included therein) to communicate with one or more software applications (e.g., software application deployed in another ECU, etc.).

ECU 400 may perform one or more operations described herein in response to the at least one processing unit 420 executing computer-executable instructions for implementing one or more of the operations described herein. These computer-executable instructions may be stored by a non-transitory computer-readable recording medium, such as memory 430 and/or storage component 440. A computer-readable medium is defined herein as a non-transitory memory device. A memory device may include memory space within a single physical storage device or memory space spread across multiple physical storage devices.

Computer-executable instructions (e.g., software instructions, etc.) may be read into memory 430 and/or storage component 440 from another computer-readable medium or from another device (e.g., a remote server, an external storage, etc.) via the communication interface 470. When executed, the computer-executable instructions stored in memory 430 and/or storage component 440 may cause the processing unit 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

Figure 5:
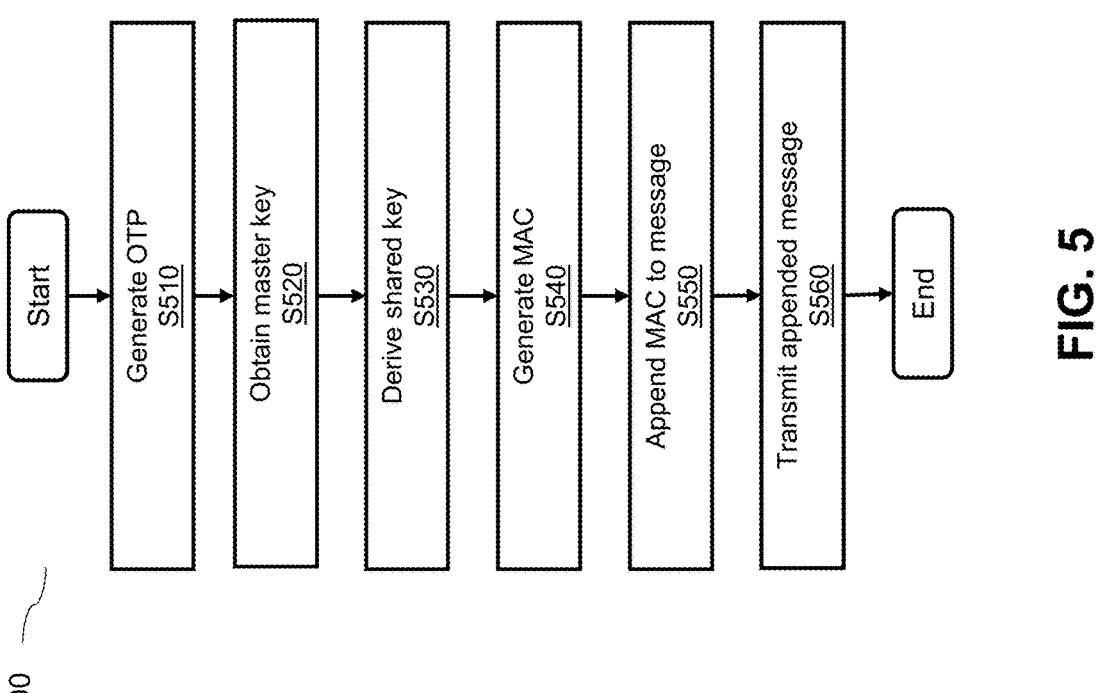

FIG. 5 illustrates a flow diagram of a method 500 for providing secured CAN communications among a sender and a receiver, according to one or more example embodiments. The method may be performed by at least one processing unit (e.g., processing unit 420) of the sender (e.g., sender 310), upon executing computer-readable instructions stored in one or more memory storages (e.g., memory 430, storage component 440, etc.). The method 500 may be triggered whenever the sender has a message to be transmitted to the receiver. The sender may be a first ECU and the receiver may be a second ECU communicatively coupled to the first ECU via, for example, a CAN bus.

As illustrated in FIG. 5, at operation S510, the at least one processing unit of the sender may be configured to generate a one-time passcode (OTP). Specifically, the at least one processing unit may obtain (e.g., from the memory storage) a master seed pre-provisioned to the sender and the receiver, obtain (e.g., from an internal clock) a timestamp, and obtain (e.g., from a positional system) a geographical location of a vehicle in which the sender is deployed. Accordingly, the at least one processing unit may generate the OTP based on the master seed, the timestamp, and the geographical location. According to example embodiments, the at least one processing unit may be configured to generate the OTP by truncating the timestamp according to a tolerance level, and then generating the OTP based on the master seed, the truncated timestamp, and the geographical location.

At operation S520, the at least one processing unit of the sender may be configured to obtain a master key. The master key may be pre-provisioned to the sender and the receiver, and may be stored in the memory storage of the sender and the receiver. It is contemplated that operations S510 and S520 may be performed in any suitable sequences (e.g., operation S520 may be performed concurrently with operation S510, operation S520 may be performed prior to operation S510, etc.), without departing from the scope of the present disclosure.

Upon receiving the master key, the method 500 may proceed to operation S530, at which the at least one processing unit of the sender may be configured to derive a shared key based on the OTP (generated at operation S510) and the master key (obtained at operation S520). According to example embodiments, the timestamp may be associated with timing information of which the vehicle changes from an ignition off (IG-OFF) state to an ignition on (IG-ON) state. In this case, the derived shared key may include a unique random number that changes each time the vehicle enters the IG-ON state from the IG-OFF state.

The specific operations associated with the derivation of the shared key have been described above with reference to FIG. 2 and FIG. 3. Thus, redundant descriptions associated therewith may be omitted below for conciseness.

Upon deriving the shared key, the method 500 may proceed to operation S540, at which the at least one processing unit of the sender may be configured to generate a message authentication code (MAC) based on the derived shared key. According to example embodiments, the at least one processing unit may obtain (e.g., from a monotonic counter) a counter value, and then generate the MAC based on the derived shared key and the counter value.

Upon generating the MAC, the method 500 may proceed to operation S550, at which the at least one processing unit of the sender may be configured to append the MAC to a message. The message may include a protocol data unit (PDU). According to example embodiments in which the counter value is involved, the at least one processing unit may append the MAC to the message by truncating the counter value and the MAC, and then appending the truncated MAC and the truncated counter value to the message.

Upon appending the MAC to the message, the method 500 may proceed to operation S560, at which the at least one processing unit of the sender may be configured to transmit the appended message to the receiver via a CAN bus.

The specific operations associated with the generation of the MAC, the appending of the MAC to the message, and the transmission of the appended message, have been described above with reference to FIG. 3. Thus, redundant descriptions associated therewith may be omitted below for conciseness.

Figure 6:
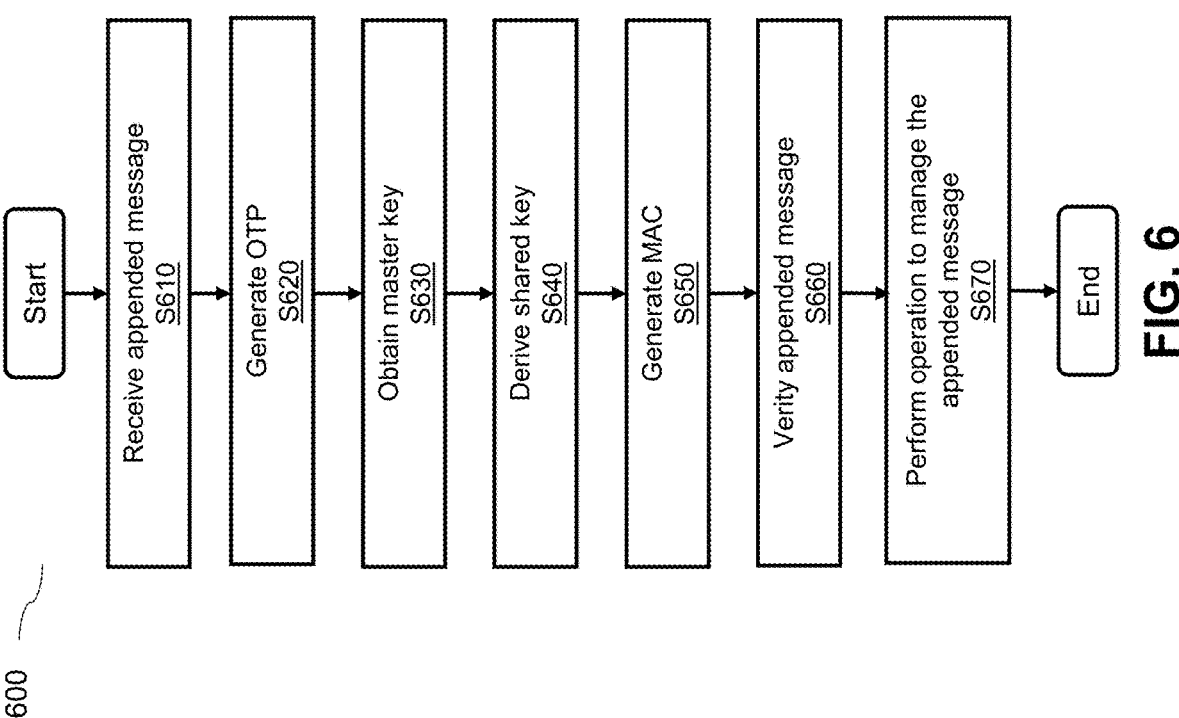
FIG. 5 and FIG. 6 each illustrate a flow diagram of an example method for providing secured CAN communications among a sender and a receiver.

FIG. 6 illustrates a flow diagram of a method 600 for providing secured CAN communications among a sender and a receiver, according to one or more example embodiments. The method may be performed by at least one processing unit (e.g., processing unit 420) of the receiver (e.g., receiver 320), upon executing computer-readable instructions stored in one or more memory storages (e.g., memory 430, storage component 440, etc.). The method 600 may be triggered whenever the receiver receives an appended message from the sender. The sender may be a first ECU and the receiver may be a second ECU communicatively coupled to the first ECU via, for example, a CAN bus. One or more operations of method 600 may be performed subsequent to one or more operations of method 500.

Referring to FIG. 6, at operation S610, the at least one processing unit of the receiver may be configured to receive the appended message from the sender via the CAN bus. Accordingly, at operation S620, the at least one processing unit of the receiver may generate another OTP in a similar manner to how the sender generates the OTP. Subsequently, at operation S630, the at least one processing unit of the receiver may obtain the master key and at operation S640, the at least one processing unit of the receiver may then derive another shared key based on the OTP (generated at operation S620) and the master key (obtained at operation S630).

The specific operations associated with the derivation of the shared key have been described above with reference to FIG. 2 and FIG. 3. Thus, redundant descriptions associated therewith may be omitted below for conciseness.

Upon deriving the another shared key, the method 600 may proceed to operation S650, at which the at least one processing unit of the receiver may be configured to generate another MAC based on the another derived shared key. In some example implementations, the at least one processing unit of the receiver may generate the another MAC based on the another derived shared key and a counter value.

According to example embodiments, before deriving the another MAC, the at least one processing unit of the receiver may check whether or not the appended message includes a counter value, and may check the counter value based on determining that the appended message includes the counter value. For instance, the at least one processing unit may obtain information of the previously received counter value, and then compare the last received counter value with the counter value included in the appended message.

Based on determining that the counter value in the appended message is greater than the previously received counter value, the at least one processing unit may determine that the newly received appended message is fresh and valid, and may update a previously stored counter value to the newly received counter value that is included in the appended message. Accordingly, the at least one processing unit may utilize the latest counter value (stored within a memory of the receiver or provided by the monotonic counter of the receiver), in addition to the another derived shared key, to compute the another MAC. For instance, the at least one processing unit may truncate the counter value and the another derived shared key, and then generate the another MAC based on the truncated counter value and the truncated derived shared key.

On the other hand, based on determining that the counter value in the appended message is less than or equal to the previously received counter value, the at least one processing unit may determine that the newly received appended message is stale or is a potential replay attack. Accordingly, the at least one processing unit may reject or discard the newly received appended message.

The specific operations associated with the generation of the MAC have been described above with reference to FIG. 3. Thus, redundant descriptions associated therewith may be omitted below for conciseness.

Upon generating the another MAC, the method 600 may proceed to operation S660, at which the at least one processing unit of the receiver may be configured to verify the appended message based on the generated MAC. For instance, the at least one processing unit may compare the generated MAC with the MAC included in the appended message, and determine whether or not the generated MAC is the same (or is within a certain level of similarity) with the MAC included in the appended message. Based on determining that the generated MAC is the same (or is within the level of similarity) with the MAC included in the appended message, the at least one processing unit of the receiver may determine that the appended message is verified. Otherwise, based on determining that the generated MAC is different from (or is not within the level of similarity) with the MAC included in the appended message, the at least one processing unit of the receiver may determine that the appended message is not verified.

Subsequently, at operation S670, the at least one processing unit of the receiver may be configured to perform one or more operations to manage the appended message, based on the verification of the appended message. For instance, based on determining that the appended message is verified, the at least one processing unit may extract the message from the appended message for further utilization (e.g., utilize the message to control various systems or components within the vehicle, log information from the message for diagnostic purposes or historical record-keeping, etc.). Conversely, based on determining that the appended message is not verified, the at least one processing unit may reject or discard the appended message.

To this end, example embodiments of the present disclosure provide secured CAN communication among an ECU (e.g., sender ECU, etc.) and other vehicle components (e.g., a receiver ECU, a sensor, etc.). Specifically, the shared key being utilized in generating the MAC for message verification is derived dynamically every time the ECU is powered up (when the vehicle first enters the IG-ON state). The shared key does not exist when the ECU is not powered up (when the vehicle is in IG-OFF state), and the shared key changes every time when the ECU is powered up (since the parameters being used for deriving the shared key change according to time and geographical location of the vehicle). Accordingly, the risk of the shared key being compromised is significantly reduced, thereby enhancing the security of the CAN communications among the ECUs and other vehicle components.

It is contemplated that features, advantages, and significances of example embodiments described hereinabove are merely a portion of the present disclosure, and are not intended to be exhaustive or to limit the scope of the present disclosure. Further descriptions of the features, components, configuration, operations, and implementations of example embodiments of the present disclosure, as well as the associated technical advantages and significances, are provided in the following.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer-readable medium at any possible technical detail level of integration. Further, as described hereinabove, one or more of the above components described above may be implemented as instructions stored on a computer readable medium and executable by at least one processor (and/or may include at least one processor). The computer-readable medium may include a computer-readable non-transitory storage medium (or media) having computer-readable program instructions thereon for causing a processor to carry out operations.

The computer readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object-oriented programming languages such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or another device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer-readable media according to various embodiments. In this regard, each block in the flowchart or block diagrams may represent a module, segment, or portion of instructions, which comprises one or more executable instructions for implementing the specified logical function(s). The method, computer system, and computer-readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

What is claimed is:

1. A method for providing secured controller area network (CAN) communications among a sender and a receiver, the method comprising:

generating, by at least one processing unit of the sender, a one-time passcode (OTP) based on at least a timestamp and a geographical location;

obtaining, by the at least one processing unit of the sender, a master key pre-provisioned to the sender and the receiver;

deriving, by the at least one processing unit of the sender, a shared key based on the OTP and the master key;

generating, by the at least one processing unit of the sender, a message authentication code (MAC) based on the derived shared key;

appending, by the at least one processing unit of the sender, the MAC to a message; and transmitting, by the at least one processing unit of the sender, the appended message to the receiver via a CAN bus, wherein the generating the MAC comprises:

obtaining, by the at least one processing unit of the sender, a counter value; and generating, by the at least one processing unit of the sender, the MAC based on the derived shared key and the counter value.

2. The method according to claim 1, wherein the generating the OTP comprises:

obtaining, by the at least one processing unit of the sender, a master seed pre-provisioned to the sender and the receiver;

obtaining, by the at least one processing unit of the sender, the timestamp;

obtaining, by the at least one processing unit of the sender, as the geographical location, a location of a vehicle in which the sender is deployed; and generating, by the at least one processing unit of the sender, the OTP based on the master seed, the timestamp, and the geographical location.

3. The method according to claim 1, wherein the sender is a first electronic control unit (ECU) and the receiver is a second ECU.

4. The method according to claim 2, wherein the timestamp is associated with timing information of which the vehicle changes from an ignition off (IG-OFF) state to an ignition on (IG-ON) state, and wherein the derived shared key comprises a unique random number that changes each time the vehicle enters the IG-ON state from the IG-OFF state.

5. The method according to claim 2, wherein the generating the OTP further comprises:

truncating, by the at least one processing unit of the sender, the timestamp according to a tolerance level; and generating, by the at least one processing unit of the sender, the OTP based on the master seed, the truncated timestamp, and the geographical location.

6. The method according to claim 1, wherein the message comprises a protocol data unit (PDU).

7. The method according to claim 1, wherein the appending the MAC to the message comprises:

truncating, by the at least one processing unit of the sender, the counter value and the MAC; and appending, by the at least one processing unit of the sender, the truncated MAC and the truncated counter value to the message.

8. The method according to claim 1, further comprising:

receiving, by the at least one processing unit of the receiver, the appended message from the sender via the CAN bus;

generating, by the at least one processing unit of the receiver, another OTP;

obtaining, by the at least one processing unit of the receiver, the master key pre-provisioned to the sender and the receiver;

deriving, by the at least one processing unit of the receiver, another shared key based on the another OTP and the master key;

generating, by the at least one processing unit of the receiver, another MAC based on the another derived shared key;

verifying, by the at least one processing unit of the receiver, the appended message based on the another MAC; and performing, by the at least one processing unit of the receiver, one or more operations to manage the appended message based on the verification of the appended message.

9. The method according to claim 8, wherein the verifying the appended message comprises:

determining, by the at least one processing unit of the receiver, whether or not the another MAC is the same as the MAC included in the appended message;

based on determining that the another MAC is the same as the MAC in the appended message, determining, by the at least one processing unit of the receiver, that the appended message is verified; and based on determining that the another MAC is different from the MAC in the appended message, determining, by the at least one processing unit of the receiver, that the appended message is not verified.

10. The method according to claim 9, wherein the performing the one or more operations comprises:

based on determining that the appended message is verified, extracting, by the at least one processing unit of the receiver, the message from the appended message for further utilization; and based on determining that the appended message is not verified, discarding, by the at least one processing unit of the receiver, the appended message.

11. A system for providing secured controller area network (CAN) communications among a sender and a receiver, the system comprising:

the sender, wherein the sender comprises:

a memory storage storing computer-executable instructions; and at least one processing unit communicatively coupled to the memory storage, wherein the at least one processing is configured to execute the instructions to:

generate a one-time passcode (OTP) based on at least a timestamp and a geographical location;

obtain a master key pre-provisioned to the sender and the receiver;

derive a shared key based on the OTP and the master key;

generate a message authentication code (MAC) based on the derived shared key;

append the MAC to a message; and transmit the appended message to the receiver via a CAN bus, wherein the at least one processing unit of the sender is configured to generate the MAC by:

obtaining, a counter value; and generating the MAC based on the derived shared key and the counter value.

12. The system according to claim 11, wherein the at least one processing unit of the sender is configured to generate the OTP by:

obtaining a master seed pre-provisioned to the sender and the receiver;

obtaining the timestamp;

obtaining, as the geographical location, a location of a vehicle in which the sender is deployed; and generating, by the at least one processing unit of the sender, the OTP based on the master seed, the timestamp, and the geographical location.

13. The system according to claim 11, wherein the sender is a first electronic control unit (ECU) and the receiver is a second ECU.

14. The system according to claim 12, wherein the timestamp is associated with timing information of which the vehicle changes from an ignition off (IG-OFF) state to an ignition on (IG-ON) state, and wherein the derived shared key comprises a unique random number that changes each time the vehicle enters the IG-ON state from the IG-OFF state.

15. The system according to claim 12, wherein the at least one processing unit of the sender is further configured to generate the OTP by:

truncating the timestamp according to a tolerance level; and generating the OTP based on the master seed, the truncated timestamp, and the geographical location.

16. The system according to claim 11, wherein the message comprises a protocol data unit (PDU).

17. The system according to claim 11, wherein the at least one processing unit of the sender is configured to append the MAC to the message by:

truncating the counter value and the MAC; and appending the truncated MAC and the truncated counter value to the message.

18. The system according to claim 11, further comprising:

the receiver, wherein the receiver comprises:

a memory storage storing computer-executable instructions; and at least one processing unit communicatively coupled to the memory storage, wherein the at least one processing is configured to execute the instructions to:

receive the appended message from the sender via the CAN bus;

generate another OTP;

obtain the master key pre-provisioned to the sender and the receiver;

derive another shared key based on the another OTP and the master key;

generate another MAC based on the another derived shared key;

verify the appended message based on the another MAC; and perform one or more operations to manage the appended message based on the verification of the appended message.

19. The system according to claim 18, wherein the at least one processing unit of the receiver is configured to verify the appended message by:

determining whether or not the another MAC is the same as the MAC included in the appended message;

based on determining that the another MAC is the same as the MAC in the appended message, determining that the appended message is verified; and based on determining that the another MAC is different from the MAC in the appended message, determining that the appended message is not verified.

20. The system according to claim 19, wherein the at least one processing unit of the receiver is configured to perform the one or more operations by:

based on determining that the appended message is verified, extracting the message from the appended message for further utilization; and based on determining that the appended message is not verified, discarding the appended message.

\* \* \* \* \*